US006271958B1

(12) United States Patent
Lin et al.

(10) Patent No.: US 6,271,958 B1
(45) Date of Patent: Aug. 7, 2001

(54) METHOD AND APPARATUS FOR CURVATURE-RESISTANT MICRO-MIRROR STRUCTURES TO REDUCE LIGHT BEAM LOSS IN FREE-SPACE MICRO-MACHINED OPTICAL SWITCHES

(75) Inventors: Lih Yuan Lin, Middletown; Evan Lee Goldstein, Princeton; Robert William Tkach, Little Silver, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/429,789

(22) Filed: Oct. 29, 1999

Related U.S. Application Data
(60) Provisional application No. 60/112,271, filed on Dec. 15, 1998.

(51) Int. Cl.[7] ..................................................... B02B 26/08
(52) U.S. Cl. ........................... 359/298; 359/848; 359/883
(58) Field of Search .................................... 359/298, 273, 359/267, 846, 848, 883

(56) References Cited

U.S. PATENT DOCUMENTS

| 5,617,262 | * | 4/1997 | Ise et al. | 359/846 |
| 5,640,282 | * | 6/1997 | Ise et al. | 359/846 |
| 5,960,132 |   | 9/1999 | Lin | 385/18 |

OTHER PUBLICATIONS

L.Y.Lin, E.L. Goldstein, J.M. Simmons, R.W. Tkach "High–Density Micromachined Polygon Optical Crossconnects Exploiting Network Connection–Symmetry" IEEE Photonics Technology Letters, vol. 10, No. 10, Oct 1998, pp. 1425–1427.

L.Y. Lin, E.L. Goldstein, R.W. Tkach "Free–Space Micromachined Optical Switches with Submillisecond Switching Time for Large–Scale Optical Crossconnects" IEEE Photonics Technology Letters, vol. 10, No. 4, Apr. 1998, pp. 525–527.

* cited by examiner

Primary Examiner—Scott J. Sugarman
Assistant Examiner—Tim Thompson
(74) Attorney, Agent, or Firm—Kenyon & Kenyon

(57) ABSTRACT

A method and apparatus for curvature-resistant micro-mirror structures to reduce light beam coupling loss due to mirror curvature in free-space micro-machined optical switches is presented. As a significant contributor to light beam coupling loss is the curvature of the micro-mirrors in these cross-connect systems, an improved thick mirror slab utilizing a phosopho-silicate glass (PSG) core is constructed. The PSG core is sandwiched between two poly-silicon layers, thus providing an enhanced, bending-resistant structure which protects the PSG core from the release etchant used in surface micro-machining and substantially reduces mirror curvature. The reflective layer is laid down on top of the enhanced, bending-resistant structure.

15 Claims, 7 Drawing Sheets

METHOD AND APPARATUS FOR CURVATURE-RESISTANT MICRO-MIRROR STRUCTURES TO REDUCE LIGHT BEAM LOSS IN FREE-SPACE MICRO-MACHINED OPTICAL SWITCHES

PRIOR PROVISIONAL PATENT APPLICATION

The present application claims the benefit of U.S. Provisional Application No. 60/112,271 filed Dec. 15, 1998.

CROSS REFERENCE TO RELATED APPLICATIONS

The present application is related to the following U.S. patent applications: U.S. Pat. No. 5,960,132 filed Dec. 31, 1997, and U.S. Provisional Application No. 60/112,278 filed Dec. 15, 1998, both of which are hereby incorporated by reference.

BACKGROUND OF THE INVENTION

1. Field of the Invention

The present invention relates to a method and apparatus for curvature-resistant micro-mirror structures to reduce light beam loss due to mirror curvature in free-space micro-machined optical switches, and more particularly, to a method and apparatus for curvature-resistant micro-mirror structures having an enhanced construction which prevents mirror curvature due to thermal and residual stresses associated with surface micro-machining processes.

2. Description of the Art

Due to very rapid increases in core-transport network demand (e.g., in the bit rates of individual services and in the number of wavelength channels being built into Wavelength Division Multiplexing (WDM) transport systems), fiber-optic switches with large port-count have quickly emerged as perhaps the most important, yet unrealized, technological need in future high-capacity light-wave networks. These fiber-optic network elements will be chiefly used for network restoration to begin with, with substantial provisioning value likely emerging thereafter.

The optical switching technologies advanced so far offer the potential advantages of bit-rate transparency, low power consumption, small volume, and low cost. Nevertheless, the requirements in port count (on the order of 512×512 and larger) and in loss budget represent deep challenges that have not yet been met by any current photonic switching technology. Although conventional mechanical switches can achieve high optical quality, they are large in size and mass, and are thus relatively slow in switching speed. On the other hand, guided-wave solid-state switches, though compact, generally have high loss and high crosstalk. The inherent disadvantages of these technologies thus appear to limit their expandability to the port counts mentioned above.

By contrast, free-space micro-machined optical-switching technology holds particular appeal in this application because it combines the advantages of free-space interconnection (i.e., low loss and high optical quality) with those of monolithic integrated optics, namely, compactness. Various small-scale (2×2) micro-machined switches utilizing sliding micro-mirrors have been demonstrated. In addition, collimating optics and rotating micro-mirrors have also been proposed as a means of achieving high-density optical switches. Given the fertility that the field of micro-optical systems is beginning to show, and the considerable variety of switching devices that has already emerged, it is likely that diverse applications will be best suited to diverse switching technologies. However, for the application of restoration and provisioning in core-transport light-wave networks, free-space micro-machined optical switches (FS-MOS) with free-rotating hinged micro-mirrors are particularly attractive. Attractive because such applications do not require frequent switching, but do require very high reliability even for switch mirrors that remain in one switching state for extended periods on the order of years. Furthermore, the sub-millisecond switching times exhibited by FS-MOS devices are well-matched to the needs of restoration and provisioning in core-transport light-wave communications networks.

However, like other optical cross-connect technologies, free-space micro-machined optical switches face the substantial challenge of achieving increased port-count while living within a specified loss budget that will in practice be fixed by adjacent transponders. Unfortunately, one significant contributor to light beam loss is the curvature of the micro-mirrors in these systems.

SUMMARY OF THE INVENTION

Accordingly, the present invention provides a method and apparatus for ameliorating the effect mirror curvature has on light beam loss through mirrors with enhanced, bending-resistant structure.

The improved thick structure is constructed utilizing a phosopho-silicate glass (PSG) in poly-silicon sandwich. A first poly-silicon layer of a particular thickness is laid down. On top of that, the PSG layer is placed, and on top of that, the second poly-silicon layer of a particular thickness is laid down. Such construction creates the PSG-in-poly-silicon layer sandwich having an enhanced, bending-resistant structure. The reflective surface, such as a thin layer of gold (Au), is then laid down on top of the structure.

The present invention, including its features and advantages, will become more apparent from the following detailed description with reference to the accompanying drawings.

DETAILED DESCRIPTION

FIGS. 1 through 8 illustrate a method and apparatus for curvature-resistant micro-mirror structures having an enhanced construction which prevents mirror curvature due to influences such as thermal and residue stresses associated with micro-machining processes.

Figure 1:
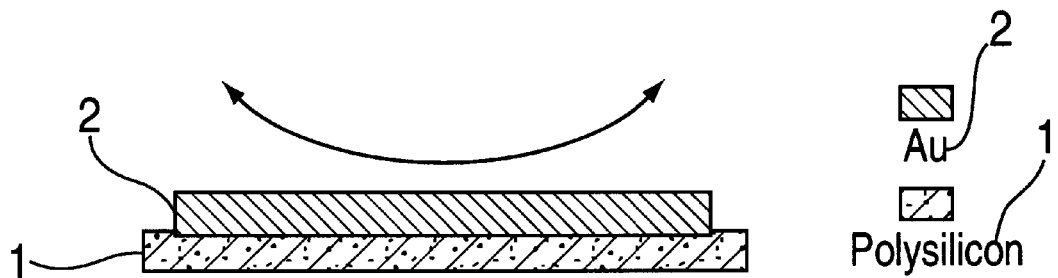
FIG. 1 illustrates a cross-section view of the construction of a single gold-on-poly-silicon mirror slab, according to the prior art.

Referring to FIG. 1, a cross-sectional view of the construction of a single gold-on-poly-silicon mirror slab according to the prior art is shown. A poly-silicon layer 1 is laid down as a base layer, usually at a thickness of 2 μm. The mirror slab is further then constructed by laying down a gold (Au) reflective coating 2 upon the poly-silicon layer 1, usually at a thickness of 5000 Å. During such micro-machining construction of the micro-mirror slab, an upward concave curvature of the mirror slab, as shown by the arrow, occurs due to such force factors as thermal stress and residue stress. Such mirror curvature decreases the effectiveness of the mirror by degrading light beam coupling quality. It is to be understood, of course, that such curvature occurs with other such types of reflective layer coatings and is not limited to the reflective layering of gold.

Figure 2:
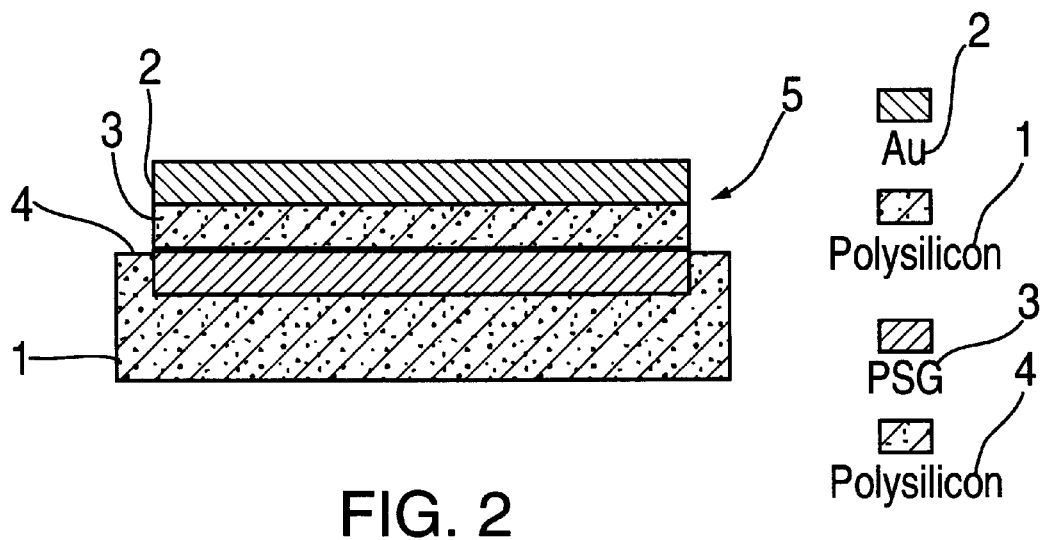
FIG. 2 illustrates a cross-section view of the construction of an improved thick mirror slab utilizing a phosopho-silicate glass (PSG) core sandwiched between two poly-silicon layers, according to an embodiment of the present invention.

Referring then to FIG. 2, a cross-sectional view of the construction of an improved thicker mirror slab is shown. Construction is begun by laying down as a base a poly-silicon layer 1, preferably at a thickness of 2 μm. On top of this, a phosopho-silicate glass (PSG) core 3 is laid down. The PSG core is preferably of a and a thickness of 0.75 μm. On top of the PSG core 3, a poly-silicon layer 4 is then laid down. The poly-silicon layer 4 is laid down such that the entire surface area of the PSG core 3 is covered, as well as any extending area of the poly-silicon layer 1. Preferably then, the poly-silicon layer 4 is of a thickness of 1.5 μm. Thus, the entire thickness of the two poly-silicon layers and the PSG core sandwiched between them is of 4.25 μm thickness. It is to be understood, of course, that the PSG core 3 may be of a length that is either equal to or less than the length of the two poly-silicon layers.

Once constructed, on top of the PSG core and two poly-silicon layer sandwich, the reflective gold layer 2 is laid down. In this manner then, construction of an improved thicker mirror slab having an enhanced bending-resistant structure is created, as is shown by the arrow in the FIG. 2. This is an improvement over the prior art mirror construction as shown in FIG. 1 as it was determined that the thickness of the gold layer 2 laid down on the poly-silicon layer 1 directly contributed, along with the forces of the micro-machining creation process, to the degree of curvature of the mirror slab. The thicker the gold layer, the greater the concave curvature as shown by the arrow in that figure. Such concave curvature force was measured at a thickness on the order of 5000 Å.

Figure 3:
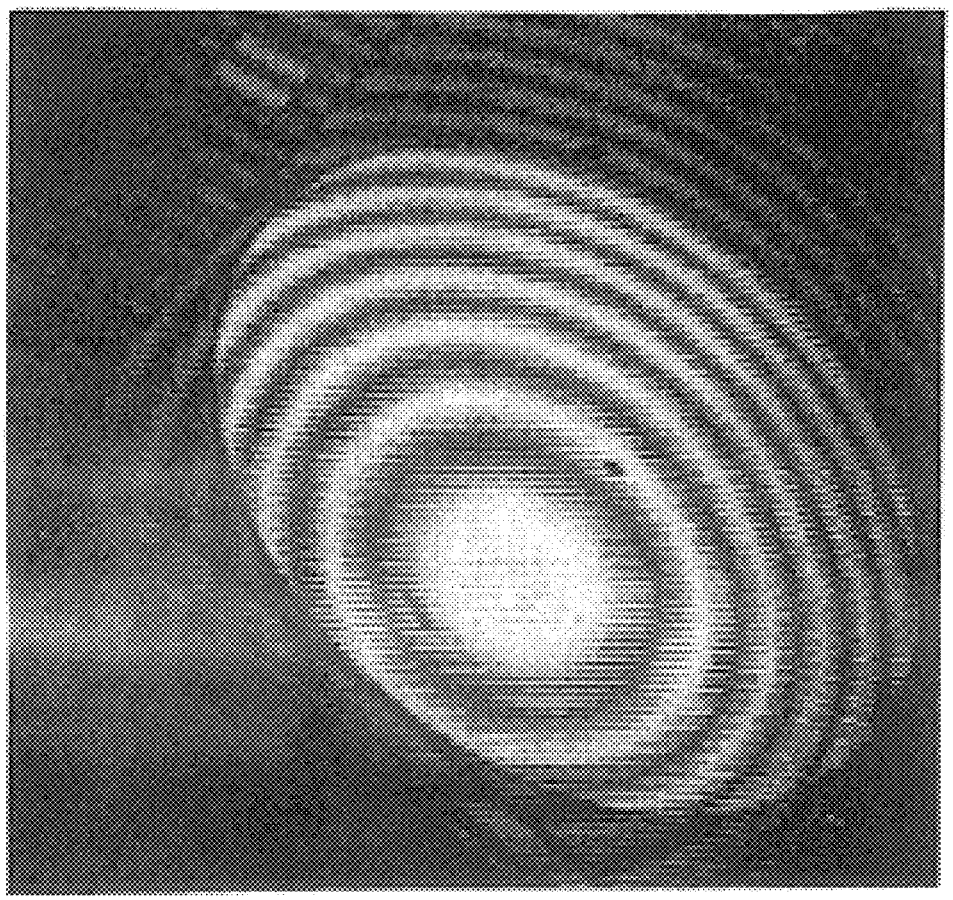
FIG. 3 illustrates a profilometer interferogram of the mirror slab of FIG. 1 with a gold reflective coating of 5000 Å, according to prior art.
Figure 4:
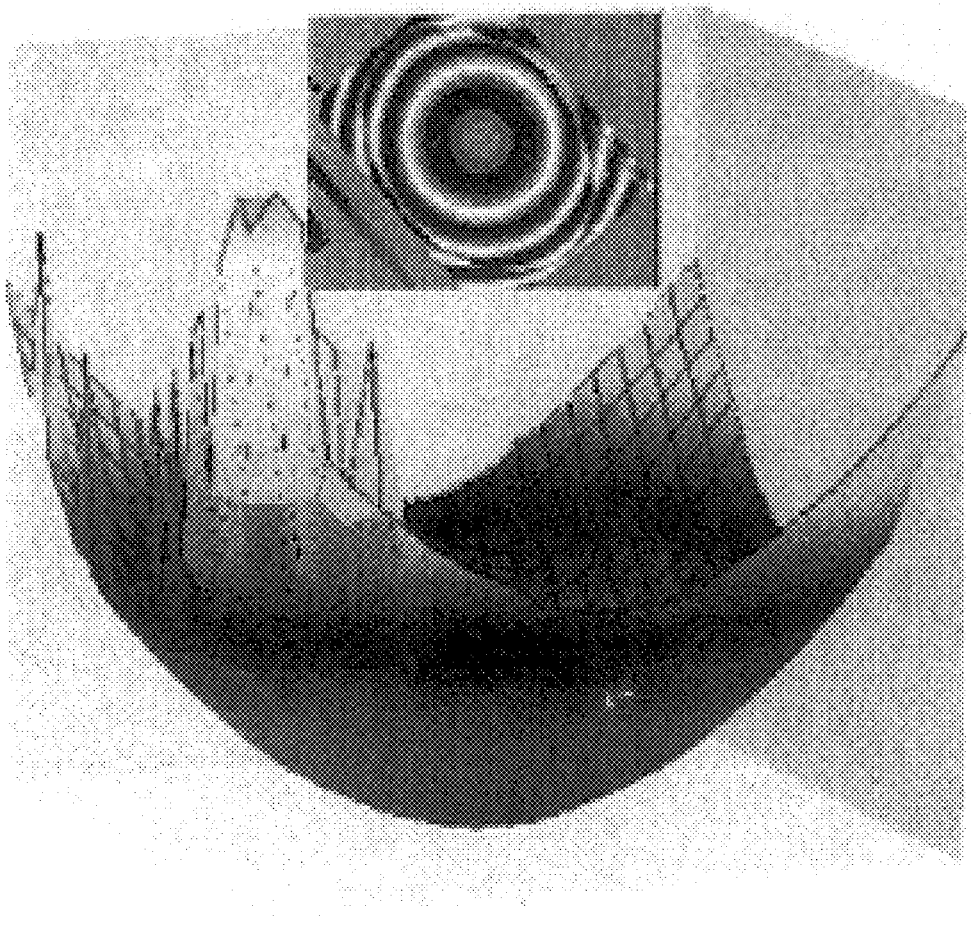
FIG. 4 illustrates a profilometer interferogram of the improved thick mirror slab of FIG. 2, according to an embodiment of the present invention.
Figure 5:
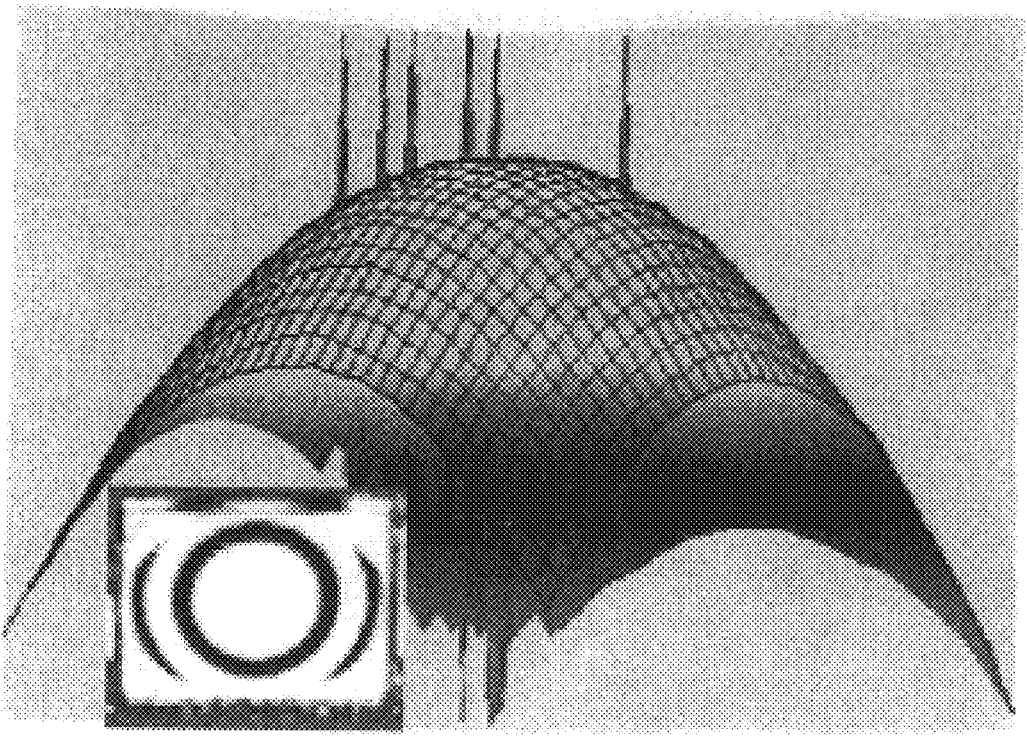
FIG. 5 illustrates a profilometer interferogram of the improved thick mirror slab of FIG. 2 with a gold reflective coating of 500 Å, according to an embodiment of the present invention.

Thus, referring now to FIG. 3, a profilometer inter-ferogram for the prior art mirror shown in FIG. 1 is shown. In this case, with a gold reflective coating of 5000 Å the mirror surface is concave with a radius of curvature equal to −11.77 mm. Correspondingly, referring now to FIG. 4, a profilometer inter-ferogram for the mirror construction of the present invention is shown. Here, the enhanced bending-resistant structure allows an increase of the radius of curvature of the mirror to −16.12 mm.

Interestingly, it was also found that thin layers of the reflective coating of gold caused an opposite convex curvature of the mirror with the enhanced structure. Such convex curvature force was measured at a thickness on the order of ≅500 Å. Thus, referring to FIG. 5, the surface profile of a mirror of 500 Å thickness is shown having a radius of curvature which is increased to +36.12 mm. An even thinner gold coating on the order of ≅300 Å provides a radius of curvature of +25.66 mm. However, such a thickness would be below the threshold of mirror reflectivity needed in the free-space micro-machined optical switches, as a 300 Å gold-coated mirror has only 52% reflectivity. Thus, it stands to reason, there is an optimum thickness of the gold reflective layering between the two extremes of 5000 and 500 Å that would balance the concave and convex curvature forces and leave the mirror flat.

Figure 6:
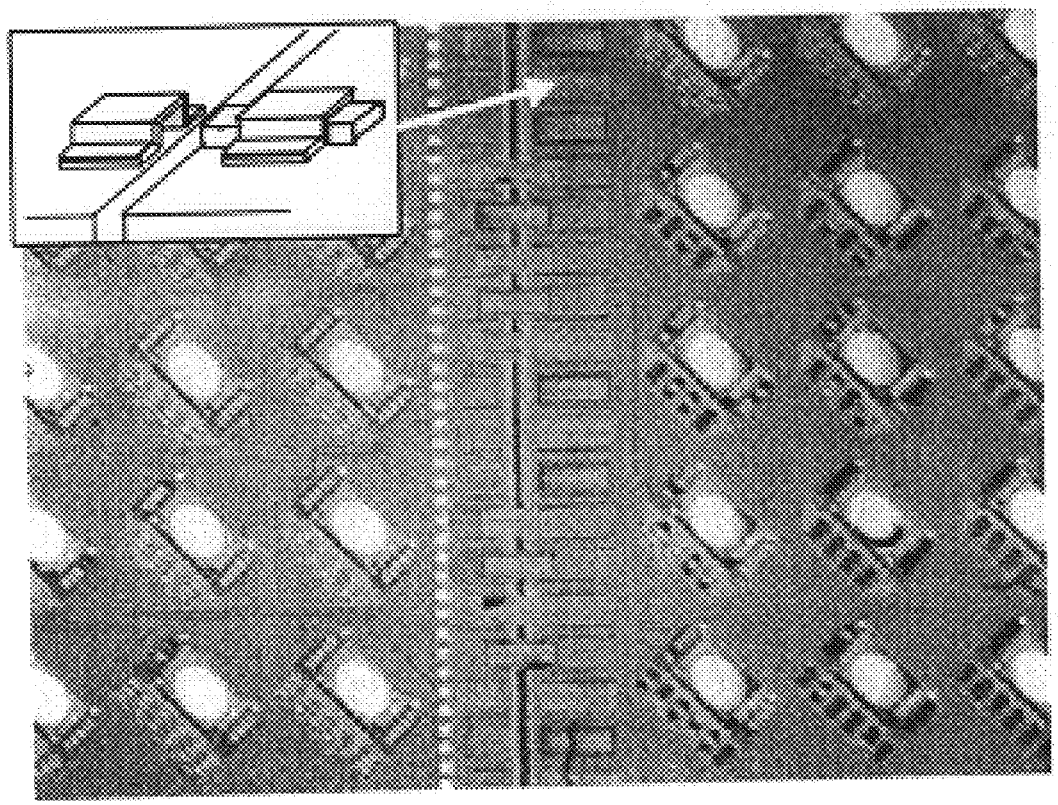
FIG. 6 illustrates a top view of inter-connecting self-aligned poly-silicon inter-chip bridging latches on the edges of two adjoining FS-MOS chips, according to an embodiment of the present invention.

Thus referring now to FIG. 6, the enhanced bending-resistant mirror slab structure 5 can be utilized in a free-space micro-machined optical switch chip 6. Accordingly, a number of the mirror slabs 5 can be constructed in place upon the FS-MOS chip 6 to create any size cross-connect. Further, as shown from a top view, two adjoining FS-MOS chips 6 can be inter-connected through the use of inter-connecting self-aligned poly-silicon inter-chip bridging latches 7. An expanded view of such a bridging latch 7 is shown by the inset in the figure. The inter-connecting bridging latch 7 itself is constructed of an insertion part 8 and a receiving part 9. The insertion part 8 has an extension 10 which slides into a hollow 11 of the receiving part 9. Each FS-MOS chip 6 will have a number of sliding parts 8 and receiving parts 9 aligned along its edges, respectively. In order to connect to adjacent FS-MOS chips 6, the bridging latches 7 are lined up and slid together.

Figure 7:
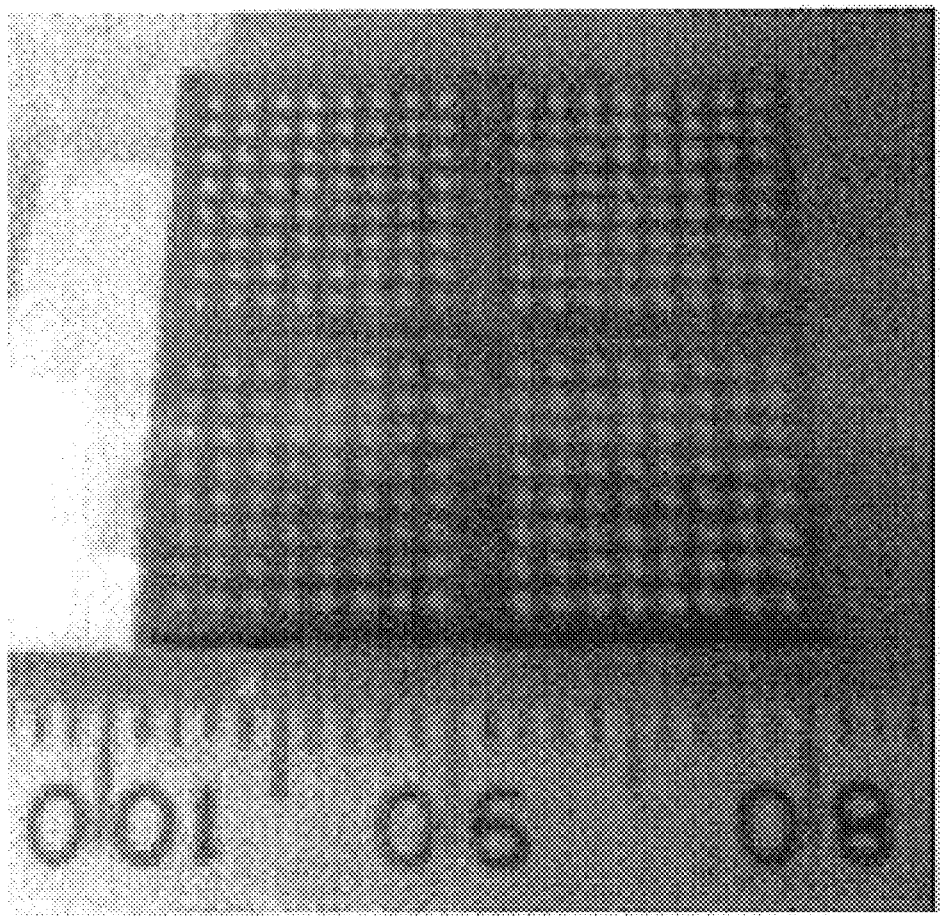
FIG. 7 illustrates a top view of a 16×16 cross-connect built up from four latched 8×8 FS-MOS chips, according to an embodiment of the present invention.

Referring to FIG. 7, such is just the case as a top view of four inter-connected and latched 8×8 FS-MOS chips 6 are shown, thereby creating a 16×16 cross-connect 12. As each 8×8 FS-MOS chip 6 is on the order of one centimeter by one centimeter, the 16×16 cross-connect 12 is on the order of two centimeters by two centimeters as shown by the ruler. Thus, utilizing the cross-connect 12 built up from the four 8×8 FS-MOS chips 6 utilizing the inter-chip bridging latches 7, experimentation and calculation of the light beam coupling loss associated with the enhanced bending-resistant mirror slab 5 can be accomplished.

Figure 8:
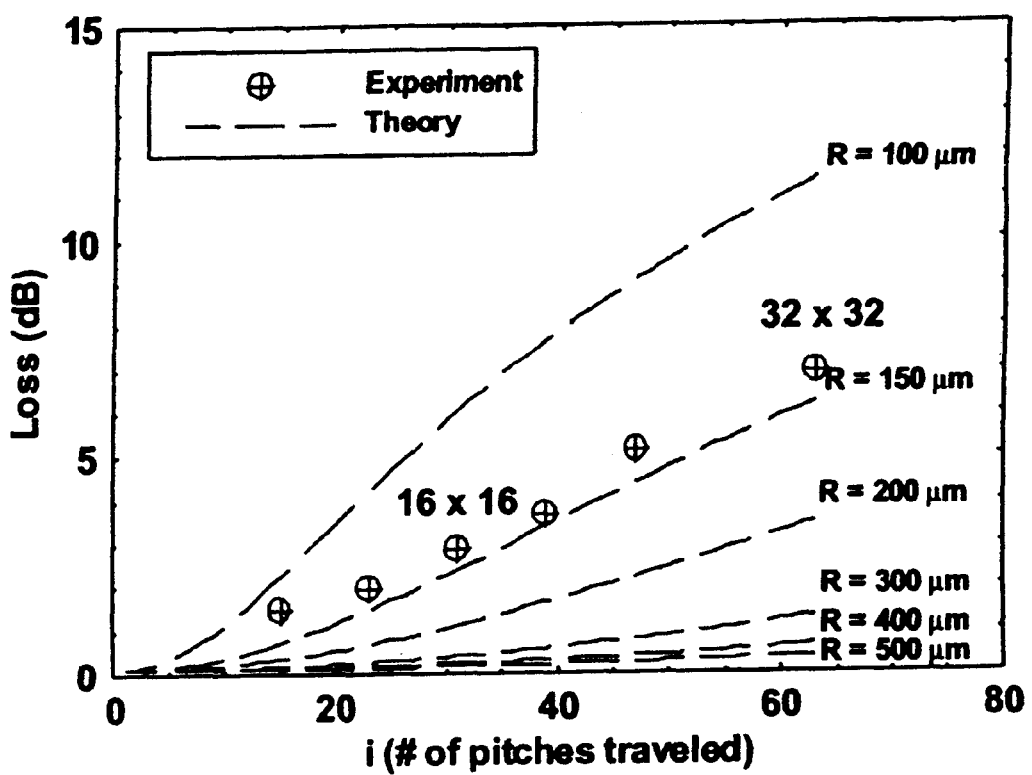
FIG. 8 illustrates a plot graph of the calculated light beam coupling loss versus the number of mirror pitches traveled in a FS-MOS having a normalized mirror radius of a=1.5 for varius mirror radii R (where a is the ratio of the mirror radius R to the half-width of the optical light beam), according to an embodiment of the present invention.

Referring now to FIG. 8, a plot graph 80 of the calculated light beam coupling loss (measured in decibels dB) versus the number of mirror pitches traveled in the FS-MOS chip having a normalized radius of a=1.5 for various mirror radii R is shown. Thus, through the longest path of the 16×16 switch 12 (i.e., across 31 mirror pitches), coupling losses of 2.9 dB were measured. This is shown by plot point A in plot graph 80. For comparison, a measured coupling loss of a simulated 32×32 switch is also shown in the figure. This measurement is obtained by increasing the path length of the light beam propagation to 63 traversed pitches. At this point, a coupling loss of 6.1 dB is measured, as is shown in plot graph 80 by plot point B. It is to be noted that these measurements are for a mirror having a mirror radius of R 150 μm.

Thus, the above analysis shows that the enhanced bending-resistant mirror slab structure 5 of the present invention represents a significant improvement over the mirror slab structure according to the prior art which was previously found to yield a light beam coupling loss of 3.5 decibels in a much smaller 8×8 cross-connect device.

In the foregoing description, the method and apparatus of the present invention have been described with reference to a number of examples that are not to be considered limiting. Rather, it is to be understood and expected that variations in the principles of the method and apparatus herein disclosed may be made by one skilled in the art and it is intended that such modifications, changes, and/or substitutions are to be included within the scope of the present invention as set forth in the appended claims. The specification and the drawings are accordingly to be regarded in an illustrative rather than in a restrictive sense.

What is claimed is:

1. A micro-mirror apparatus for use in a free-space micro-machined optical switch, the micro-mirror apparatus comprising:
    a first poly-silicon layer, which first layer acts as a base;
    a phosopho-silicate glass (PSG) core, which core is laid down on top of the base;
    a second poly-silicon layer, which second layer is laid down on top of the first poly-silicon layer and the phosopho-silicate glass core thereby creating an enhanced bending-resistant structure; and
    a reflective surface layer, which layer is laid down on top of the enhanced bending-resistant structure.

2. The apparatus according to claim 1, wherein the reflective surface layer can have a thickness of less than 5000 Å and greater than 500 Å without causing curvature of the micro-mirror apparatus due to the enhanced bending-resistant structure.

3. The apparatus according to claim 1, wherein the reflective surface layer is gold.

4. The apparatus according to claim 1, wherein the enhanced bending-resistant structure has a thickness of 4.25 $\mu$m.

5. The apparatus according to claim 1, wherein the PSG core is less than or the same length as each of the first and second poly-silicon layers.

6. An apparatus for a micro-mirror, the apparatus comprising:
    an enhanced bending-resistant structure, the structure comprising:
        a bottom poly-silicon layer;
        a phosopho-silicate glass core; and
        a top poly-silicon layer,
        wherein the phosopho-silicate glass core is sandwiched between the bottom and top poly-silicon layers; and
    a reflective surface layer, which layer is laid down on top of the enhanced bending-resistant structure.

7. The apparatus according to claim 6, wherein the reflective surface layer can have a thickness of less than 5000 Å and greater than 500 Å without causing the curvature of the micro-mirror due to the sandwiching of the glass core between the bottom and top layers.

8. The apparatus according to claim 6, wherein the reflective surface layer is gold.

9. The apparatus according to claim 6, wherein the sandwiching of the glass core between the bottom and top layers has a thickness of 0.75 $\mu$m.

10. The apparatus according to claim 6, wherein the phosoph-silicate glass core is less than or the same length as each of the first and second poly-silicon layers.

11. A method of creating a micro-mirror with an enhanced bending-resistant structure for use in a free-space micro-machined optical switch, the method comprising the steps of:
    laying down a first poly-silicate layer as a base;
    placing a phosopho-silicate glass (PSG) core on top of the base;
    laying down a second poly-silicate layer on top of the PSG core and base; and
    laying down a reflective surface on top of the second poly-silicate layer.

12. The method according to claim 11, wherein the reflective surface layer can have a thickness of less than 5000 Å and greater than 500 Å without causing curvature of the micro-mirror due to the sandwiching of the glass core between the two poly-silicate layers.

13. The method according to claim 11, wherein the reflective surface layer is gold.

14. The method according to claim 11, wherein the glass core and the two poly-silicate layers create a sandwich having a thickness of 4.25 $\mu$m.

15. The method according to claim 11, wherein the phosopho-silicate glass core is less than or the same length as each of the first and second poly-silicon layers.

* * * * *